(12) United States Patent
Rawal et al.

(10) Patent No.: US 8,094,434 B2
(45) Date of Patent: Jan. 10, 2012

(54) HERMETICALLY SEALED CAPACITOR ASSEMBLY

(75) Inventors: Bharat Rawal, Surfside Beach, SC (US); Gang Ning, Myrtle Beach, SC (US); Brady Jones, Carson City, NV (US); Zebbie Lynn Sebald, Myrtle Beach, SC (US); Stanislav Zednicek, Lanskroun (CZ); Zdenek Sita, Lanskroun (CZ)

(73) Assignee: AVX Corporation, Myrtle Beach, SC (US)

( * ) Notice: Subject to any disclaimer, the term of this patent is extended or adjusted under 35 U.S.C. 154(b) by 256 days.

(21) Appl. No.: 12/060,354

(22) Filed: Apr. 1, 2008

(65) Prior Publication Data

US 2009/0244812 A1    Oct. 1, 2009

(51) Int. Cl.
H01G 4/228 (2006.01)
H01G 9/10 (2006.01)
H01G 9/00 (2006.01)
H05K 5/06 (2006.01)

(52) U.S. Cl. .......... 361/538; 361/540; 361/536

(58) Field of Classification Search .......... 361/540, 361/538, 537, 536, 535
See application file for complete search history.

(56) References Cited

U.S. PATENT DOCUMENTS

| | | |
|---|---|---|
| 3,345,545 A | 10/1967 | Bourgault et al. |
| 3,922,773 A | 12/1975 | Marien et al. |
| 4,085,435 A | 4/1978 | Galvagni |
| 4,479,168 A | 10/1984 | Green, Jr. |
| 4,755,908 A | 7/1988 | Gardner |
| 4,910,645 A | 3/1990 | Jonas et al. |
| 4,945,452 A | 7/1990 | Sturmer et al. |
| 4,959,430 A | 9/1990 | Jonas et al. |
| 5,111,327 A | 5/1992 | Blohm et al. |
| 5,198,968 A | 3/1993 | Galvagni |
| 5,300,575 A | 4/1994 | Jonas et al. |
| 5,314,606 A | 5/1994 | Irie et al. |
| 5,357,399 A | 10/1994 | Salisbury |
| 5,394,295 A | 2/1995 | Galvagni et al. |
| 5,457,862 A | 10/1995 | Sakata et al. |
| 5,473,503 A | 12/1995 | Sakata et al. |
| 5,495,386 A | 2/1996 | Kulkarni |
| 5,586,000 A | 12/1996 | Sakata et al. |
| 5,608,261 A | 3/1997 | Bhattacharyya et al. |
| 5,638,253 A * | 6/1997 | Hasegawa ............ 361/535 |
| 5,694,287 A | 12/1997 | Nishiyama et al. |
| 5,729,428 A | 3/1998 | Sakata et al. |

(Continued)

FOREIGN PATENT DOCUMENTS

GB    1069685    8/1965

(Continued)

OTHER PUBLICATIONS

Machine translation of JP2005217129.*

(Continued)

*Primary Examiner* — Eric Thomas
*Assistant Examiner* — David M Sinclair
(74) *Attorney, Agent, or Firm* — Dority & Manning, P.A.

(57) ABSTRACT

A capacitor assembly that includes a conductive polymer electrolytic capacitor that is enclosed and hermetically sealed within a ceramic housing in the presence of an inert gas is provided. Without intending to be limited by theory, the present inventors believe that the ceramic housing is capable of limiting the amount of oxygen and moisture supplied to the conductive polymer of the capacitor. In this manner, the conductive polymer is less likely to oxidize in high temperature environments, thus increasing the thermal stability of the capacitor assembly.

15 Claims, 9 Drawing Sheets

U.S. PATENT DOCUMENTS

| | | | |
|---|---|---|---|
| 5,812,367 A | 9/1998 | Kudoh et al. | |
| 5,949,639 A | 9/1999 | Maeda et al. | |
| 5,951,840 A * | 9/1999 | Fukaumi et al. | 205/173 |
| 6,052,273 A * | 4/2000 | Inoue et al. | 361/523 |
| 6,191,936 B1 | 2/2001 | Webber et al. | |
| 6,197,252 B1 | 3/2001 | Bishop et al. | |
| 6,322,912 B1 | 11/2001 | Fife | |
| 6,369,239 B2 | 4/2002 | Rauchschwalbe et al. | |
| 6,391,275 B1 | 5/2002 | Fife | |
| 6,416,730 B1 | 7/2002 | Fife | |
| 6,527,937 B2 | 3/2003 | Fife | |
| 6,528,662 B2 | 3/2003 | Jonas | |
| 6,576,099 B2 | 6/2003 | Kimmel et al. | |
| 6,592,740 B2 | 7/2003 | Fife | |
| 6,635,729 B1 | 10/2003 | Groenendaal et al. | |
| 6,639,787 B2 | 10/2003 | Kimmel et al. | |
| 6,674,635 B1 | 1/2004 | Fife et al. | |
| 6,756,473 B2 | 6/2004 | Reuter et al. | |
| 6,891,016 B2 | 5/2005 | Reuter et al. | |
| 6,987,663 B2 | 1/2006 | Merker et al. | |
| 7,102,016 B2 | 9/2006 | Reuter | |
| 7,116,548 B2 | 10/2006 | Satterfield, Jr. et al. | |
| 7,118,690 B2 | 10/2006 | Wessling et al. | |
| 7,154,740 B2 | 12/2006 | Merker et al. | |
| 7,220,397 B2 | 5/2007 | Kimmel et al. | |
| 7,262,511 B2 | 8/2007 | Osako et al. | |
| 7,279,015 B2 | 10/2007 | Merker | |
| 7,304,832 B2 | 12/2007 | Ushio et al. | |
| 7,312,979 B2 * | 12/2007 | Ishizuka et al. | 361/537 |
| 7,341,705 B2 | 3/2008 | Schnitter | |
| 7,341,801 B2 | 3/2008 | Reuter et al. | |
| 7,358,326 B2 | 4/2008 | Heuer et al. | |
| 7,377,947 B2 | 5/2008 | Merker et al. | |
| 7,411,779 B2 | 8/2008 | Merker et al. | |
| 7,449,588 B2 | 11/2008 | Jonas et al. | |
| 7,515,396 B2 | 4/2009 | Biler | |
| 7,554,793 B2 | 6/2009 | Chacko | |
| 7,563,290 B2 | 7/2009 | Qiu et al. | |
| 7,585,983 B2 | 9/2009 | Reuter et al. | |
| 7,688,571 B2 * | 3/2010 | Ishizuka et al. | 361/540 |
| 7,750,099 B2 | 7/2010 | Chikusa et al. | |
| 7,785,493 B2 | 8/2010 | Jonas et al. | |
| 2001/0012193 A1 * | 8/2001 | Watanabe et al. | 361/502 |
| 2005/0013765 A1 | 1/2005 | Thomas et al. | |
| 2005/0019581 A1 * | 1/2005 | Schnitter | 428/411.1 |
| 2005/0065352 A1 | 3/2005 | Brassat et al. | |
| 2005/0103638 A1 | 5/2005 | Schnitter et al. | |
| 2005/0167789 A1 | 8/2005 | Zhuang | |
| 2006/0035143 A1 | 2/2006 | Kida et al. | |
| 2006/0180797 A1 | 8/2006 | Merker et al. | |
| 2006/0260713 A1 * | 11/2006 | Pyszczek et al. | 141/311 R |
| 2007/0064376 A1 | 3/2007 | Merker et al. | |
| 2007/0138606 A1 | 6/2007 | Brailey | |
| 2007/0177333 A1 * | 8/2007 | Umemoto et al. | 361/502 |
| 2008/0005878 A1 | 1/2008 | Merker et al. | |
| 2009/0030149 A1 | 1/2009 | Morita et al. | |
| 2009/0310285 A1 | 12/2009 | Reuter et al. | |
| 2009/0318710 A1 | 12/2009 | Brassat et al. | |
| 2010/0148124 A1 | 6/2010 | Reuter et al. | |
| 2010/0265634 A1 | 10/2010 | Freeman et al. | |

FOREIGN PATENT DOCUMENTS

| | | | |
|---|---|---|---|
| JP | 3127813 A | 5/1991 | |
| JP | 11112157 A | 4/1999 | |
| JP | 2005217129 A | 8/2005 | |
| JP | 2006269864 A * | 10/2006 | |
| JP | 2006278875 A * | 10/2006 | |
| WO | WO 2009030615 | 3/2009 | |
| WO | WO 2009043648 | 4/2009 | |
| WO | WO 2009047059 | 4/2009 | |
| WO | WO 2009135752 | 11/2009 | |
| WO | WO 2009141209 | 11/2009 | |
| WO | WO 2010003874 | 1/2010 | |
| WO | WO 2010015468 | 2/2010 | |
| WO | WO 2010089111 | 8/2010 | |
| WO | WO 2010102751 | 9/2010 | |

OTHER PUBLICATIONS

Machine translation of JP2006-278875A (previosuly cited).*
Abstract of Japanese Patent No. JP1140621 dated Jun. 1, 1989.
Abstract of Japanese Patent No. JP3109712 dated May 9, 1991.
Abstract of Japanese Patent No. JP3109713 dated May 9, 1991.
Abstract of Japanese Patent No. JP3109714 dated May 9, 1991.
Search Report for GB0901684.1 dated Nov. 13, 2009, 3 pages.
Related U.S. Patent Application Form.
Paper—Simpson et al., "Advances and Applications of Inherently Conductive Polymer Technologies Based on Poly(3,4-Ethylenedioxythiophene)," 2005 AIMCAL Fall Technical Conference and 19th International Vacuum Web Coating Conference, Oct. 16-20, 2005, Session 5: Advances in Technology, Myrtle Beach, SC, 10 pages.
Paper—Merker et al., "Conducting Polymer Dispersions for High-Capacitance Tantalum Capacitors,": CARTS Europe 2006, Sep. 2006, Bad Homburg, Germany, 6 pages.
Paper—Freeman et al., "Electrical Characterization of Polymer Tantalum Capacitors with Poly(3,4-Ethylenedioxythiophene) Cathode," Journal of the Electrochemical Society, vol. 156, No. 6, 2009, 10 pages.
Paper—Merker et al., "New Conducting Polymer Dispersions for Solid Electrolytic Capacitors," CARTS Europe 2005, Oct. 17-20, 2005, Prague, CZ Republic, 6 pages.
Paper—Young et al., "Performance and Reliability Study of High Voltage Tantalum Polymer Capacitors," 2010 Electronic Components Association, Inc., Arlington, VA; CARTS 2010 Conference Proceedings, CARTS 2010 Conference, New Orleans, LA, Apr. 2010, 13 pages.
Paper—Merker et al., "Tuning Conducting Polymer Dispersions for High-CV Tantalum Capacitors," CARTS Europe Oct. 29-Nov. 1, 2007, Barcelona, Spain, 6 pages.
Presentation—Freeman et al., "Hermetically Sealed Polymer Tantalum Capacitors," CMSE Europe 2010.

* cited by examiner

HERMETICALLY SEALED CAPACITOR ASSEMBLY

BACKGROUND OF THE INVENTION

Electrolytic capacitors (e.g., tantalum capacitors) are increasingly being used in the design of circuits due to their volumetric efficiency, reliability, and process compatibility. For example, one type of capacitor that has been developed is a solid electrolytic capacitor that includes an anode (e.g., tantalum), a dielectric oxide film (e.g., tantalum pentoxide, $Ta_2O_5$) formed on the anode, a solid electrolyte layer, and a cathode. The solid electrolyte layer may be formed from a conductive polymer, such as described in U.S. Pat. No. 5,457,862 to Sakata et al., U.S. Pat. No. 5,473,503 to Sakata, et al., U.S. Pat. No. 5,729,428 to Sakata, et al., and U.S. Pat. No. 5,812,367 to Kudoh, et al. Unfortunately, however, the stability of the conductive polymer is poor at high temperatures due to its tendency to transform from a doped to an un-doped state, or vice versa. As a result of the transformation, the conductivity of the polymer may decrease, which directly affects the capacitance and ESR and leads to performance degradation.

As such, a need currently exists for a solid electrolytic capacitor having improved performance in high temperature environments.

SUMMARY OF THE INVENTION

In accordance with one embodiment of the present invention, a capacitor assembly is disclosed that comprises a ceramic housing within which an electrolytic capacitor is enclosed and hermetically sealed. The capacitor comprises an anode, a dielectric layer overlying the anode, and a cathode overlying the dielectric layer. The cathode includes a conductive polymer. The ceramic housing defines a cavity having a gaseous atmosphere that contains an inert gas. The assembly further comprises a cathode termination that is in electrical connection with the cathode and located external to the ceramic housing and an anode termination that is in electrical connection with the anode lead and located external to the ceramic housing.

In accordance with another embodiment of the present invention, a method of forming a capacitor assembly is disclosed. The method comprises providing an electrolytic capacitor comprising an anode, dielectric layer overlying the anode, and cathode overlying the dielectric layer, wherein the cathode includes a conductive polymer and an anode lead extends from the anode. The electrolytic capacitor is positioned within a ceramic housing. The cathode is electrically connected to a cathode termination and the anode lead is electrically connected to an anode termination. A lid is positioned over the ceramic housing. The lid is hermetically sealed to the ceramic housing in the presence of a gaseous atmosphere containing an inert gas.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
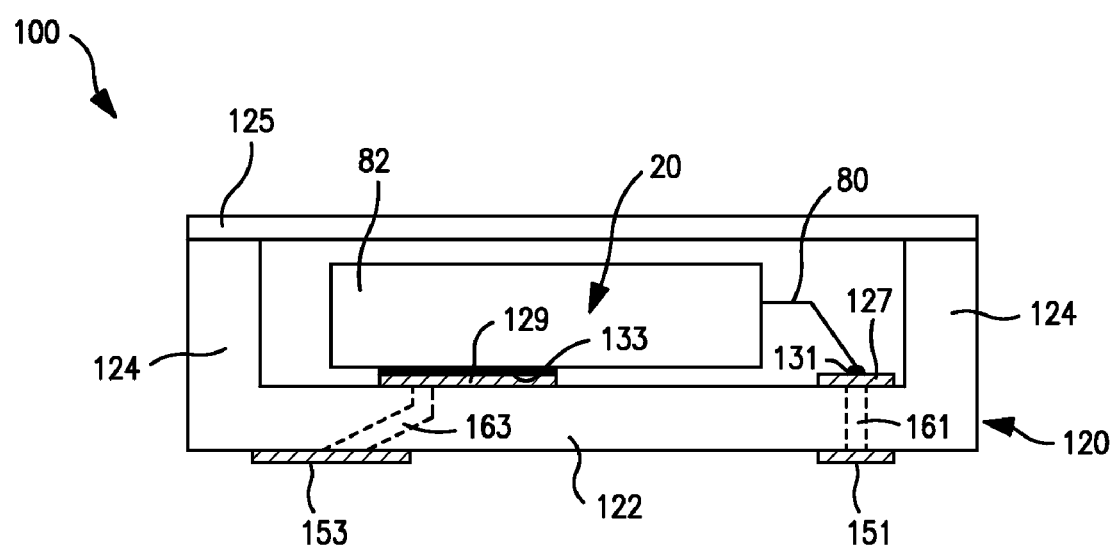
FIG. 1 is a cross-sectional view of one embodiment of an electrolytic capacitor assembly of the assembly of the present invention.
Figure 1:
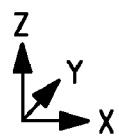

Repeat use of references characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a capacitor assembly that includes a conductive polymer electrolytic capacitor that is enclosed and hermetically sealed within a ceramic housing in the presence of an inert gas. Without intending to be limited by theory, the present inventors believe that the ceramic housing is capable of limiting the amount of oxygen and moisture supplied to the conductive polymer of the capacitor. In this manner, the conductive polymer is less likely to oxidize in high temperature environments, thus increasing the thermal stability of the capacitor assembly.

The electrolytic capacitor generally contains an anode formed from a valve metal composition. The valve metal composition may have a high specific charge of about 5,000 $\mu F*V/g$ or more, in some embodiments about 25,000 $\mu F*V/g$ or more, in some embodiments about 40,000 $\mu F*V/g$ or more, and in some embodiments, from about 70,000 to about 200,000 $\mu F*V/g$ or more. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of $1:1.0\pm1.0$, in some embodiments $1:1.0\pm0.3$, in some embodiments $1:1.0\pm0.1$, and in some embodiments, $1:1.0\pm0.05$. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S.

Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

Conventional fabricating procedures may generally be utilized to form the anode. In one embodiment, a tantalum or niobium oxide powder having a certain particle size is first selected. For example, the particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 $m^2/g$, in some embodiments from about 0.5 to about 5.0 $m^2/g$, and in some embodiments, from about 1.0 to about 2.0 $m^2/g$. The term "specific surface area" refers to the surface area determined by the physical gas adsorption (B.E.T.) method of Bruanauer, Emmet, and Teller, Journal of American Chemical Society, Vol. 60,1938, p. 309, with nitrogen as the adsorption gas. Likewise, the bulk (or Scott) density is typically from about 0.1 to about 5.0 $g/cm^3$, in some embodiments from about 0.2 to about 4.0 $g/cm^3$, and in some embodiments, from about 0.5 to about 3.0 $g/cm^3$.

To facilitate the construction of the anode, other components may be added to the electrically conductive particles. For example, the electrically conductive particles may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), polyvinyl alcohols, naphtaline, vegetable wax, and microwaxes (purified paraffins). The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

The resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode wire (e.g., tantalum wire). It should be further appreciated that the anode wire may alternatively be attached (e.g., welded) to the anode body subsequent to pressing and/or sintering of the anode body. After compression, any binder/lubricant may be removed by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the pellet is sintered to form a porous, integral mass. For example, in one embodiment, the pellet may be sintered at a temperature of from about 1200° C. to about 2000° C., and in some embodiments, from about 1500° C. to about 1800° C. under vacuum or an inert atmosphere. Upon sintering, the pellet shrinks due to the growth of bonds between the particles. In addition to the techniques described above, any other technique for constructing the anode body may also be utilized in accordance with the present invention, such as described in U.S. Pat. No. 4,085,435 to Galvagni; U.S. Pat. No. 4,945,452 to Sturmer, et al.; U.S. Pat. No. 5,198,968 to Galvagni; U.S. Pat. No. 5,357,399 to Salisburv; U.S. Pat. No. 5,394,295 to Galvagni, et al.; U.S. Pat. No. 5,495,386 to Kulkarni; and U.S. Pat. No. 6,322,912 to Fife, which are incorporated herein in their entirety by reference thereto for all purposes.

Although not required, the thickness of the anode may be selected to improve the electrical performance of the capacitor. For example, the thickness of the anode may be about 4 millimeters or less, in some embodiments, from about 0.2 to about 3 millimeters, and in some embodiments, from about 0.4 to about 1 millimeter. The shape of the anode may also be selected to improve the electrical properties of the resulting capacitor. For example, the anode may have a shape that is curved, sinusoidal, rectangular, U-shaped, V-shaped, etc. The anode may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al., all of which are incorporated herein in their entirety by reference thereto for all purposes.

Once constructed, the anode may be anodized so that a dielectric layer is formed over and/or within the anode. Anodization is an electrochemical process by which the anode is oxidized to form a material having a relatively high dielectric constant. For example, a niobium oxide (NbO) anode may be anodized to niobium pentoxide ($Nb_2O_5$). Typically, anodization is performed by initially applying an electrolyte to the anode, such as by dipping anode into the electrolyte. The electrolyte is generally in the form of a liquid, such as a solution (e.g., aqueous or non-aqueous), dispersion, melt, etc. A solvent is generally employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to help achieve the desired oxide. In fact, water may constitute about 50 wt. % or more, in some embodiments, about 70 wt. % or more, and in some embodiments, about 90 wt. % to 100 wt. % of the solvent(s) used in the electrolyte.

The electrolyte is ionically conductive and may have an ionic conductivity of about 1 milliSiemens per centimeter ("mS/cm") or more, in some embodiments about 30 mS/cm or more, and in some embodiments, from about 40 mS/cm to about 100 mS/cm, determined at a temperature of 25° C. To enhance the ionic conductivity of the electrolyte, a compound may be employed that is capable of dissociating in the solvent to form ions. Suitable ionic compounds for this purpose may include, for instance, acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired ionic conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

A current is passed through the electrolyte to form the dielectric layer. The value of voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the surface of the anode. Of course, other known methods may also be employed, such as pulse or step potentiostatic methods. The voltage typically ranges from about 4 to about 200 V, and in some embodiments, from about 9 to about 100 V. During anodic oxidation, the electrolyte can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

Once the dielectric layer is formed, a protective coating may optionally be applied, such as one made of a relatively insulative resinous material (natural or synthetic). Such materials may have a specific resistivity of greater than about 10 $\Omega$/cm, in some embodiments greater than about 100, in some embodiments greater than about 1,000 $\Omega$/cm, in some embodiments greater than about $1\times10^5$ $\Omega$/cm, and in some embodiments, greater than about $1\times10^{10}$ $\Omega$/cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

The anodized part is thereafter subjected to a step for forming a conductive polymer cathode. The conductive polymer coating may contain one or more polyheterocycles (e.g., polypyrroles; polythiophenes, poly(3,4-ethylenedioxythiophene) (PEDT); polyanilines); polyacetylenes; poly-p-phenylenes; polyphenolates; and derivatives thereof. Moreover, if desired, the conductive polymer coating may also be formed from multiple conductive polymer layers. For example, in one embodiment, the conductive polymer cathode may contain one layer formed from PEDT and another layer formed from a polypyrrole. Various methods may be utilized to apply the conductive polymer coating onto the anode part. For instance, conventional techniques such as electropolymerization, screen-printing, dipping, electrophoretic coating, and spraying, may be used to form a conductive polymer coating. In one embodiment, for example, the monomer(s) used to form the conductive polymer (e.g., 3,4-ethylenedioxy-thiophene) may initially be mixed with a polymerization catalyst to form a solution. For example, one suitable polymerization catalyst is BAYTRON C, which is iron III toluene-sulfonate and sold by H. C. Starck. BAYTRON C is a commercially available catalyst for BAYTRON M, which is 3,4-ethylene dioxythiophene, a PEDT monomer also sold by H. C. Starck. Once a catalyst dispersion is formed, the anode part may then be dipped into the dispersion so that the polymer forms on the surface of the anode part. Alternatively, the catalyst and monomer(s) may also be applied separately to the anode part. In one embodiment, for example, the catalyst may be dissolved in a solvent (e.g., butanol) and then applied to the anode part as a dipping solution. The anode part may then be dried to remove the solvent therefrom. Thereafter, the anode part may be dipped into a solution containing the appropriate monomer. Once the monomer contacts the surface of the anode part containing the catalyst, it chemically polymerizes thereon. In addition, the catalyst (e.g., BAYTRON C) may also be mixed with the material(s) used to form the optional protective coating (e.g., resinous materials). In such instances, the anode part may then be dipped into a solution containing the monomer (BAYTRON M). As a result, the monomer can contact the catalyst within and/or on the surface of the protective coating and react therewith to form the conductive polymer coating. Although various methods have been described above, it should be understood that any other method for applying the conductive coating(s) to the anode part may also be utilized in the present invention. For example, other methods for applying such conductive polymer coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al., which are incorporated herein in their entirety by reference thereto for all purposes.

In most embodiments, once applied, the conductive polymer is healed. Healing may occur after each application of a conductive polymer layer or may occur after the application of the entire conductive polymer coating. In some embodiments, for example, the conductive polymer may be healed by dipping the pellet into an electrolyte solution, such as a solution of phosphoric acid and/or sulfuric acid, and thereafter applying a constant voltage to the solution until the current is reduced to a preselected level. If desired, such healing may be accomplished in multiple steps. For instance, in one embodiment, a pellet having a conductive polymer coating is first dipped in phosphoric acid and applied with about 20 Volts and then dipped in sulfuric acid and applied with about 2 Volts. In this embodiment, the use of the second low voltage sulfuric acid solution or toluene sulfonic acid can help increase capacitance and reduce the dissipation factor (DF) of the resulting capacitor. After application of some or all of the layers described above, the pellet may then be washed if desired to remove various byproducts, excess catalysts, and so forth. Further, in some instances, drying may be utilized after some or all of the dipping operations described above. For example, drying may be desired after applying the catalyst and/or after washing the pellet in order to open the pores of the pellet so that it can receive a liquid during subsequent dipping steps.

If desired, the part may optionally be applied with a carbon layer (e.g., graphite) and silver layer, respectively. The silver coating may, for instance, act as a solderable conductor, contact layer, and/or charge collector for the capacitor and the carbon coating may limit contact of the silver coating with the conductive polymer. Such coatings may cover some or all of the conductive polymer.

Regardless of the specific manner in which it is formed, a ceramic housing is provided in accordance with the present invention to enclose and hermetically seal the capacitor. Generally speaking, hermetic sealing of the capacitor within the ceramic housing occurs in the presence of a gaseous atmosphere that contains at least one inert gas so as to inhibit oxidation of the conductive polymer cathode during use. The inert gas may include, for instance, nitrogen, helium, argon, xenon, neon, krypton, radon, and so forth, as well as mixtures thereof. Typically, inert gases constitute the majority of the atmosphere within the ceramic housing, such as from about 50 wt. % to 100 wt. %, in some embodiments from about 75 wt. % to 100 wt. %, and in some embodiments, from about 90 wt. % to about 99 wt. % of the atmosphere. If desired, a relatively small amount of non-inert gases may also be employed, such as carbon dioxide, oxygen, water vapor, etc. In such cases, however, the non-inert gases typically constitute 15 wt. % or less, in some embodiments 10 wt. % or less, in some embodiments about 5 wt. % or less, in some embodiments about 1 wt. % or less, and in some embodiments, from about 0.01 wt. % to about 1 wt. % of the atmosphere within the ceramic housing. For example, the moisture content (expressed in terms of relatively humidity) may be about 10% or less, in some embodiments about 5% or less, in some embodiments about 1% or less, and in some embodiments, from about 0.01 to about 5%.

The ceramic housing may include one or more layers of a ceramic material, such as aluminum nitride, aluminum oxide, silicon oxide, magnesium oxide, calcium oxide, and so forth. The width and length of the ceramic housing may vary depending on the intended application. In one embodiment, for example, the length of the housing (−y direction in FIG. 1) is from about 2.0 to about 10.0 millimeters, in some embodiments from about 2.5 to about 8.0 millimeters, and in some embodiments, from about 3.0 to about 6.5 millimeters. The width of the housing (−x direction in FIG. 1) may range from about 1.0 to about 5 millimeters, in some embodiments from about 1.5 to about 4.5 millimeters, and in some embodiments, from about 2.0 to about 3.5 millimeter. The overall height of the housing (−z direction in FIG. 1) may optionally remain small so that the resultant assembly is readily incorporated into low profile products. For example, the thickness of the housing may be about 5.0 millimeters or less, in some embodiments from about 0.4 to about 3.5 millimeters, and in some embodiments, from about 0.5 to about 3.0 millimeters.

The manner in which the capacitor is electrically connected to the ceramic housing may vary as is known in the art. For example, one or more surfaces of the housing may include conductive traces that electrically connect to the anode and cathode terminations of the capacitor. Any conductive material may be employed to form the traces, such as a conductive metal (e.g., copper, nickel, silver, zinc, tin, palladium, lead, copper, aluminum, molybdenum, titanium, iron, zirconium, tungsten, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The traces may be formed using any known technique, such as by printing or coating an ink containing the metal onto a surface of the housing. If desired, one or more thin outer metal layers (e.g., gold) may be coated or deposited onto a base metal layer (e.g., copper alloy) to further increase conductivity.

The traces are electrically connected with external anode and cathode terminations for mounting the capacitor assembly onto a surface. The terminations may simply be formed by extending the traces through the ceramic housing. Alternatively, the terminations may be in the form of pins, pads, sheets, etc., which are connected to the traces through the ceramic housing. Regardless, the thickness or height of the terminations is generally selected to minimize the thickness of the capacitor assembly. For instance, the thickness of the terminations may range from about 0.05 to about 1 millimeter, in some embodiments from about 0.05 to about 0.5 millimeters, and from about 0.1 to about 0.2 millimeters. If desired, the surface of the terminations may be electroplated with nickel, silver, gold, tin, etc. as is known in the art to ensure that the final part is mountable to the circuit board. In one particular embodiment, both surfaces of the terminations are plated with nickel and silver flashes, respectively, while the mounting surface is also plated with a tin solder layer.

Referring to FIG. 1, for example, one embodiment of such a capacitor assembly 100 is shown that contains a ceramic housing 120 and an electrolytic capacitor 20. The ceramic housing 120 includes a lower wall 122 and two opposing sidewalls 124 between which a cavity 126 is formed that includes the capacitor 20. The lower wall 122 and sidewalls 124 are formed from one or more layers of a ceramic material such as described above. In this particular embodiment, the lower wall 122 also contains conductive traces 127 and 129 that are electrically connected to an anode lead 80 and cathode 82, respectively, of the capacitor 20. Connection of the traces 127 and 129 to the lead 80 and cathode 82 may be made using any known technique, such as welding, laser welding, conductive adhesives, etc. In one particular embodiment, for example, a conductive adhesive 131 is used to connect the lead 80 to the conductive trace 127. Likewise, a conductive adhesive 133 is used to connect the cathode 82 to the conductive trace 129. The conductive adhesives may be formed from conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osako, et al., which is incorporated herein in its entirety by reference thereto for all purposes.

The conductive trace 127 is connected to an external anode termination 151 through the ceramic wall 122 via a connection 161, while the conductive trace 129 is connected to an external cathode termination 153 via a connection 163. The connections 161 and 163 may be in the form of a wire, strip, sheet, post, etc., and may be formed from a metal. Alternatively, the traces may simply extend through a pathway of the ceramic wall to form the external terminations. Various techniques for providing conductive terminations in a ceramic housing are described in more detail in U.S. Pat. No. 5,314, 606 to Irie, et al. and U.S. Pat. No. 7,304,832 to Ushio, et al., as well as U.S. Patent Application Publication No. 2005/0167789 to Zhuang and 2007/0138606 to Brailey, all of which are incorporated herein in their entirety by reference thereto for all purposes.

Once the capacitor 20 is positioned within the ceramic housing 120, a lid 125 is then placed on an upper surface of the side walls 124. The lid 125 may be formed from a ceramic, metal (e.g., iron, copper, nickel, cobalt, etc., as well as alloys thereof), and so forth. In one embodiment, for example, the lid contains a Kovar® alloy (Carpenter Technology Corporation), which is a nickel-cobalt ferrous alloy. The size of the housing 120 is generally such that the lid 125 does not contact any surface of the capacitor 20 so that it is not contaminated. When placed in the desired position, the lid 125 is hermetically sealed to the sidewalls 124 using known techniques, such as welding (e.g., resistance welding, laser welding, etc.), soldering, etc. Hermetic sealing generally occurs in the presence of inert gases as described above so that the resulting assembly is substantially free of reactive gases, such as oxygen or water vapor.

Although not required, other layers and/or materials may also be employed in the ceramic housing 120. For example, one or more barrier members (not shown) may be formed on the lower wall 122, sidewall(s) 124, and/or lid 125 to inhibit damage to the capacitor 20 during hermetic sealing of the assembly. The barrier member(s) may be formed from any materials known in the art, such as antireflection materials that are capable of preventing a laser beam from being reflected. Examples of such materials may include polymers, such as epoxy resins, polyimides, polyolefins (e.g., polyethylene or polypropylene), optionally containing filler particles (e.g., black pigment).

As a result of the present invention, the capacitor assembly may exhibit excellent electrical properties even when exposed to high temperature environments. For example, the capacitor assembly may have an equivalence series resistance ("ESR") of less than about 50 ohms, in some embodiments less than about 25 ohms, in some embodiments from about 0.01 to about 10 ohms, and in some embodiments, from about 0.1 to about 5 ohms, measured at an operating frequency of 120 Hz. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 1 $\mu A/\mu F^*V$, in some embodiments less than about 0.5 $\mu A/\mu F^*V$, and in some embodiments, less than about 0.1 $\mu A/\mu F^*V$, where $\mu A$ is microamps and $\mu F^*V$ is the product of the capacitance and the rated voltage. Such ESR and normalized leakage current values may even be maintained after aging for a substantial amount of time at high temperatures. For example, the values may be maintained for about 100 hours or more, in some embodiments from about 300 hours to about 2500 hours, and in some embodiments, from about 400 hours to about 1500 hours (e.g., 500 hours, 600 hours, 700 hours, 800 hours, 900 hours, 1000 hours, 1100 hours, or 1200 hours) at temperatures ranging from about 100° C. to about 250° C., and, in some embodiments from about 100° C. to about 200° C. (e.g., 100° C., 125° C., 150° C., 175° C., or 200° C.).

The present invention may be better understood by reference to the following examples.

Test Procedures

Equivalent Series Resistance (ESR) and Capacitance:

Equivalence series resistance and capacitance were measured using an Agilent 4284A LCR meters with 2 volts bias and an AC signal. The operating frequency was 120 Hz.

Leakage Current:

Leakage current ("DCL") was measured using a MC 190 Leakage test set made by Mantracourt Electronics LTD, UK. The MC 190 test measured leakage current at a rated voltage of 10 volts after 30 seconds.

EXAMPLE 1

70,000 $\mu FV/g$ tantalum powder (HC Starck) was pressed into pellets. Anodic oxidation was then carried out in an aqueous solution containing phosphoric acid. The voltage was chosen to obtain a targeted capacitance of 33 $\mu F$ at a rated voltage of 10.0V. After anodic oxidation, the pellets were coated with a PEDT conductive polymer layer, a graphite coating and a silver coating by conventional technology known to the skilled in art. The capacitor body had a size of 2.44 mm×1.78 mm×0.68 mm.

A ceramic container was also obtained Kyocera America, Inc. of San Diego, Calif. under the name "Cap Pak." For attachment of the tantalum capacitor inside the ceramic container, a silver-loaded epoxy adhesive (Thermoset K 611-14, Lord Corporation) was employed. The lead wire (tantalum) of the capacitor was first glued to a conductive trace inside the container and thereafter a portion of the capacitor was glued to another conductive trace. The resulting assembly was heated in a convection oven preset at 85° C. for 45 minutes to cure the adhesive. To ensure the bonds were solid, 0.01 grams of an additional epoxy adhesive (Henkel-Loctite) was also applied. This additional adhesive was then cured at room temperature for 60 minutes. A Kovar® metal lid was also provided and shaped to snugly match the size of the ceramic container. After curing of the adhesives, the lid was placed over the top of the container so that there was no direct contact between the interior surface of the lid and the exterior surface of the attached capacitor. The resulting assembly was then placed into a welding chamber and purged with nitrogen gas for 120 minutes before seam welding at 60° C. was performed. No burn-in or healing was performed after the seam welding.

Figure 2:
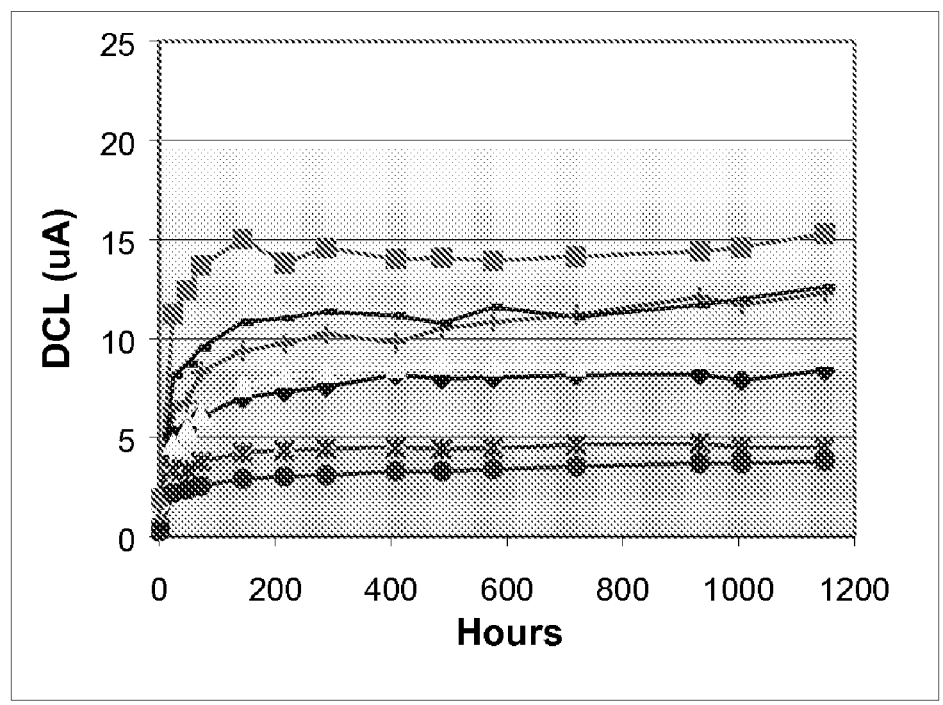
FIGS. 2-4 are graphical representations of the leakage current ("DCL"), capacitance, and ESR of the parts of Example 1 at different stages of load life testing.
Figure 3:
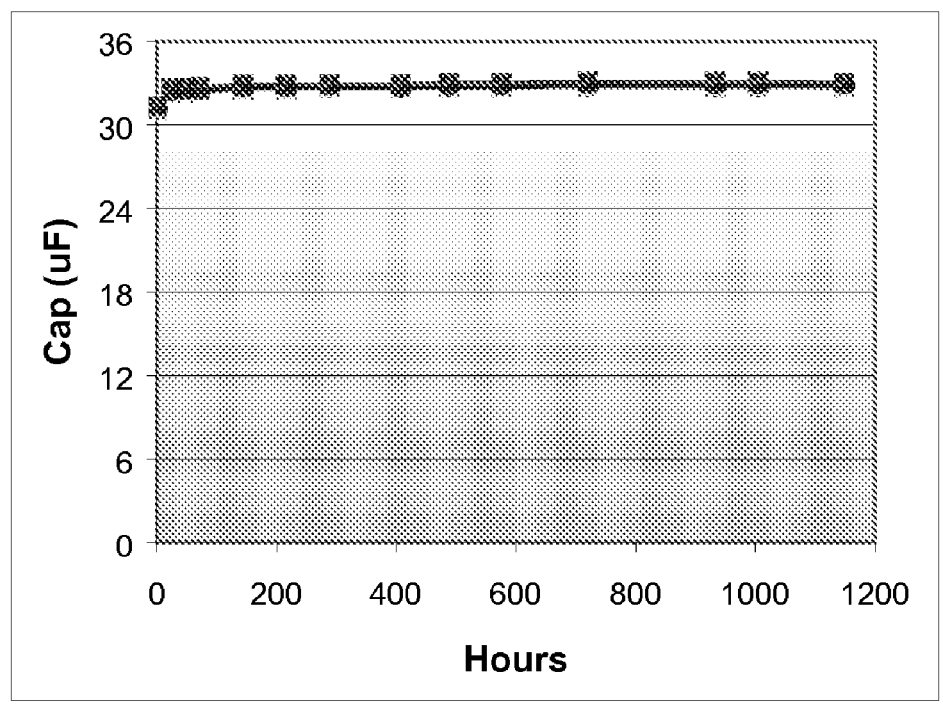
Figure 4:
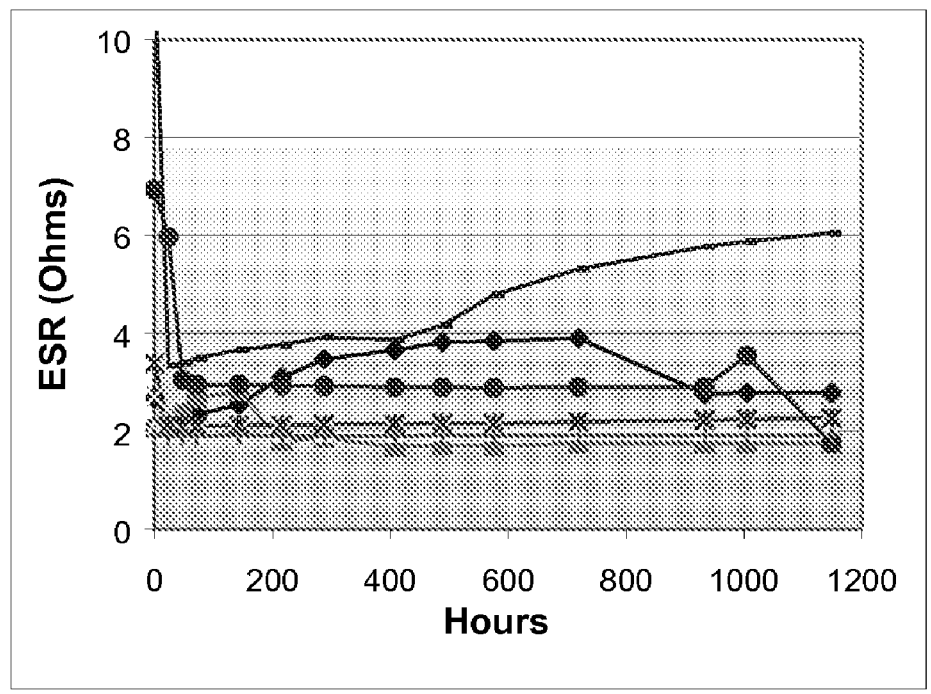

Upon formation, the parts were placed in air at 150° C. for shelf testing. On a weekly basis, the leakage current (DCL), equivalent series resistance (ESR), and capacitance of the parts were determined at room temperature (23° C.±2° C.) to verify whether the part had shown any degradation. The results are shown in FIGS. 2-4. As shown, a few abrupt changes occurred within the first 100 hours and then the performance stabilized to almost 1200 hours. The changes within the first 100 hours may potentially relate to thermal healing of the tantalum pentoxide dielectric. Notably, only 1 out of 9 samples showed an irregular ESR of about 6.0Ω after 1200 hours, which was believed to result from poor attachment of the capacitor. No significant change in capacitance was found. The leakage current ("DCL") presented a very flat plateau and a range between 3.0 and 16.0 $\mu A$ after 1200 hours, which was normal because the measured DCL had not reached the steady-state leakage current.

EXAMPLE 2

Capacitor assemblies were prepared as described in Example 1, except that the parts were placed in air at 175° C.

Figure 5:
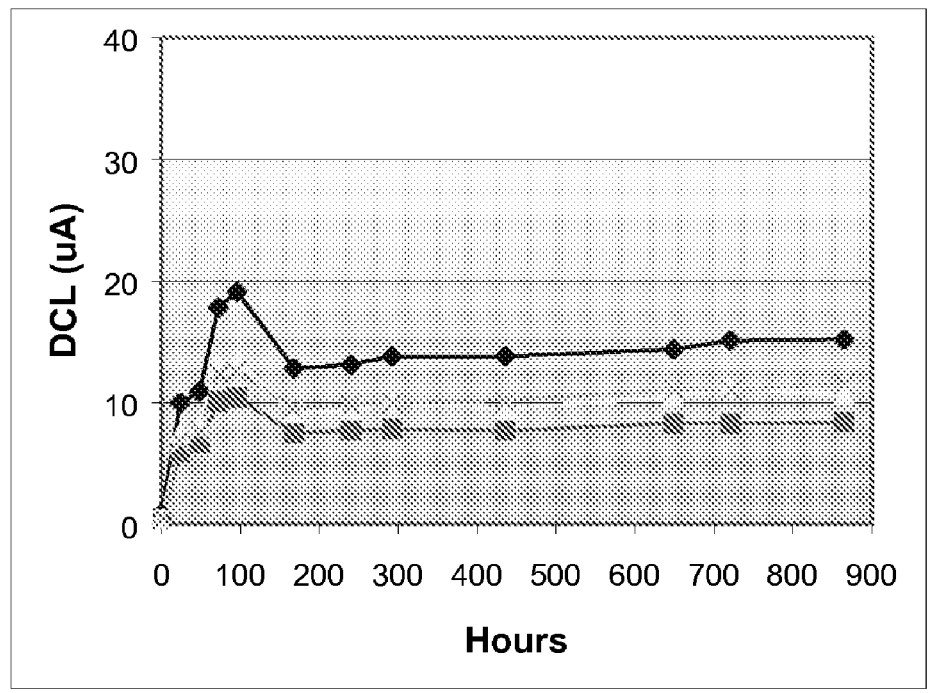
FIGS. 5-7 are graphical representations of the leakage current ("DCL"), capacitance, and ESR of the parts of Example 2 at different stages of load life testing.
Figure 6:
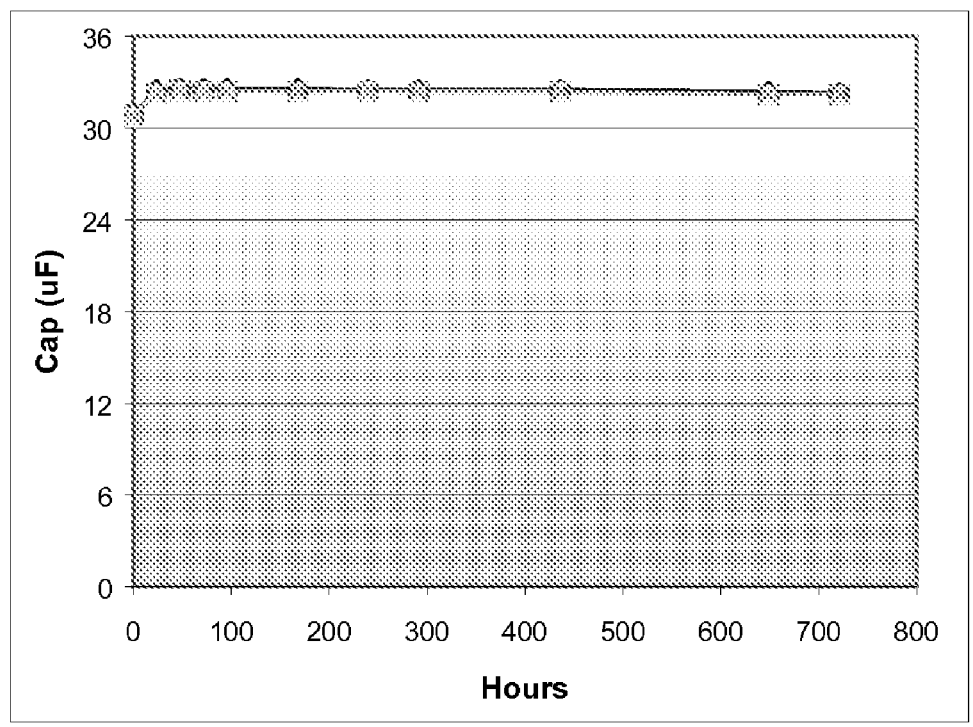
Figure 7:
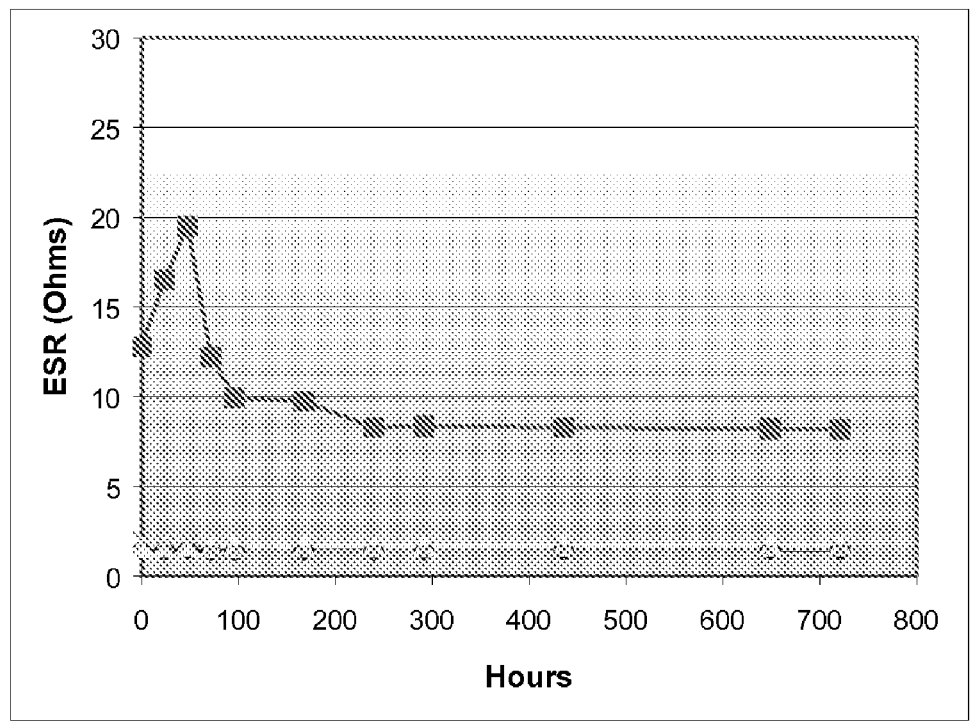

Testing was performed on a weekly basis as described in Example 1. The results are shown in FIGS. 5-7. Similar to Example 1, no significant degradation was found.

EXAMPLE 3

Figure 8:
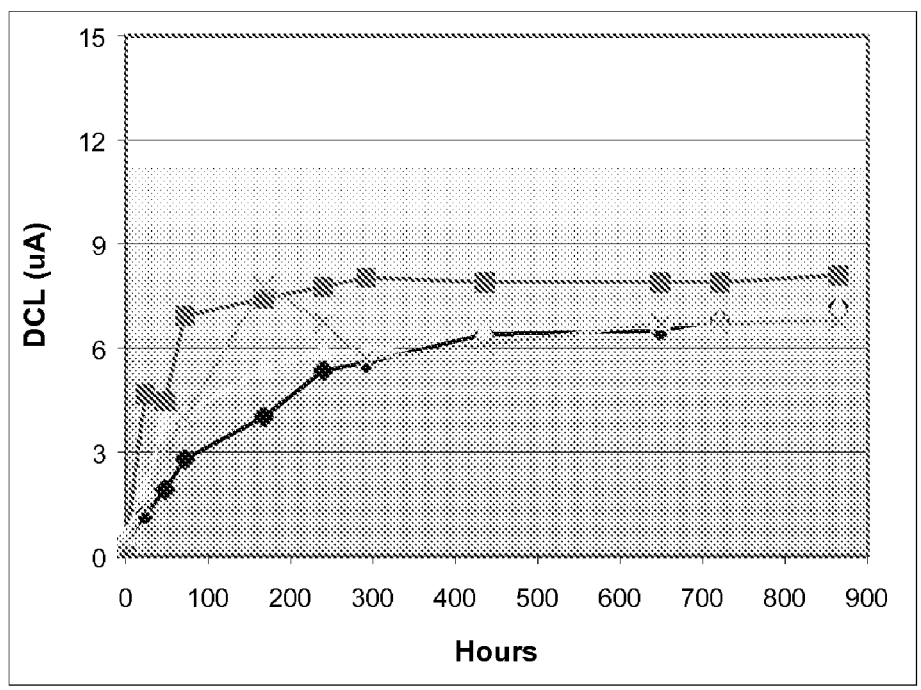
FIGS. 8-10 are graphical representations of the leakage current ("DCL"), capacitance, and ESR of the parts of Example 3 at different stages of load life testing.
Figure 9:
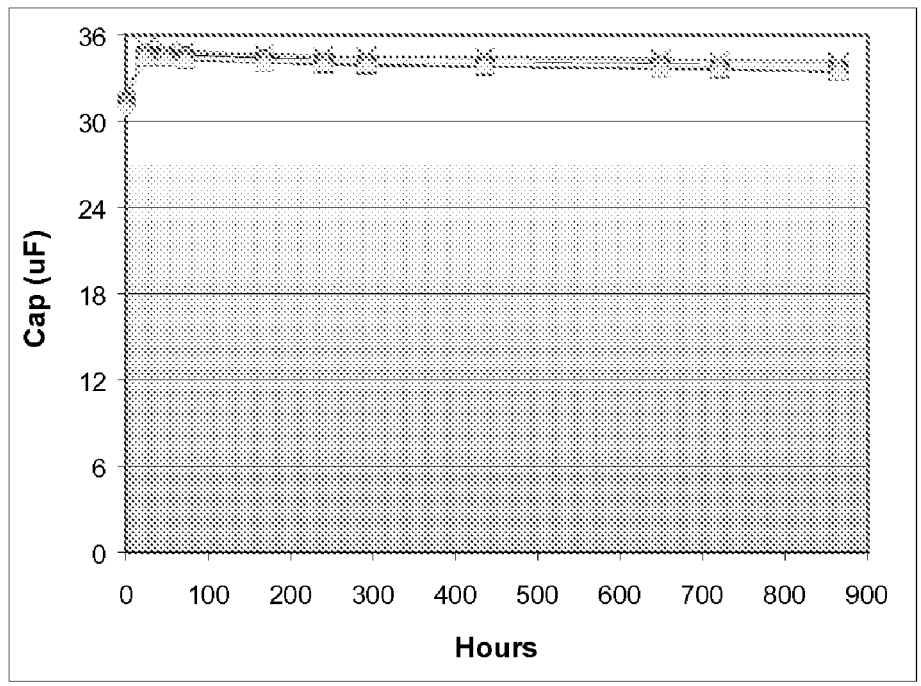
Figure 10:
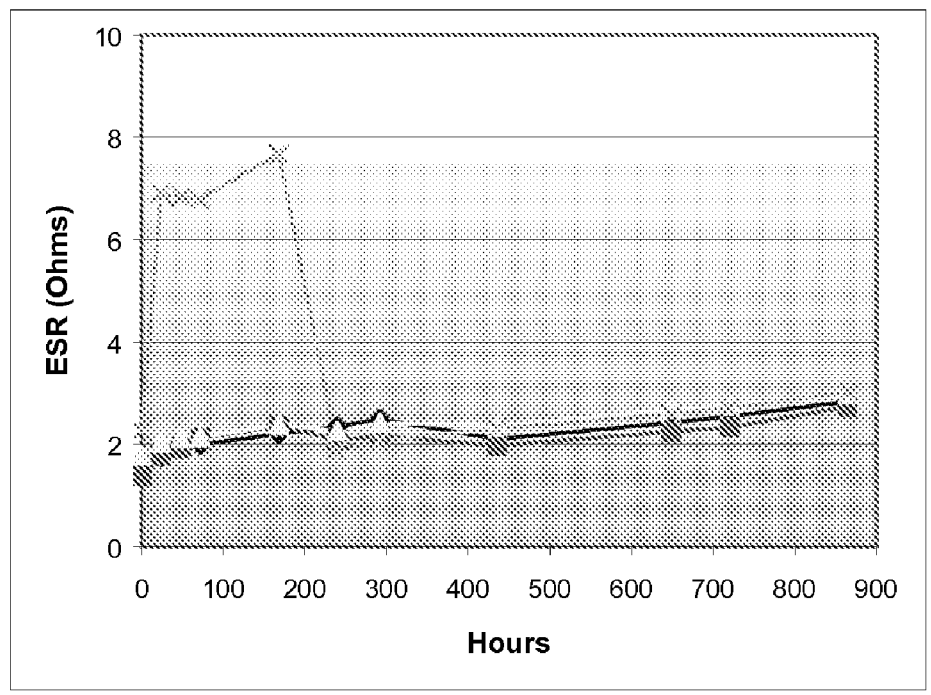

Capacitor assemblies were prepared as described in Example 1, except that the parts were placed in air at 200° C. Testing was performed on a weekly basis as described in Example 1. The results are shown in FIGS. 8-10. Similar to Example 1, no significant degradation was found.

EXAMPLE 4

Figure 11:
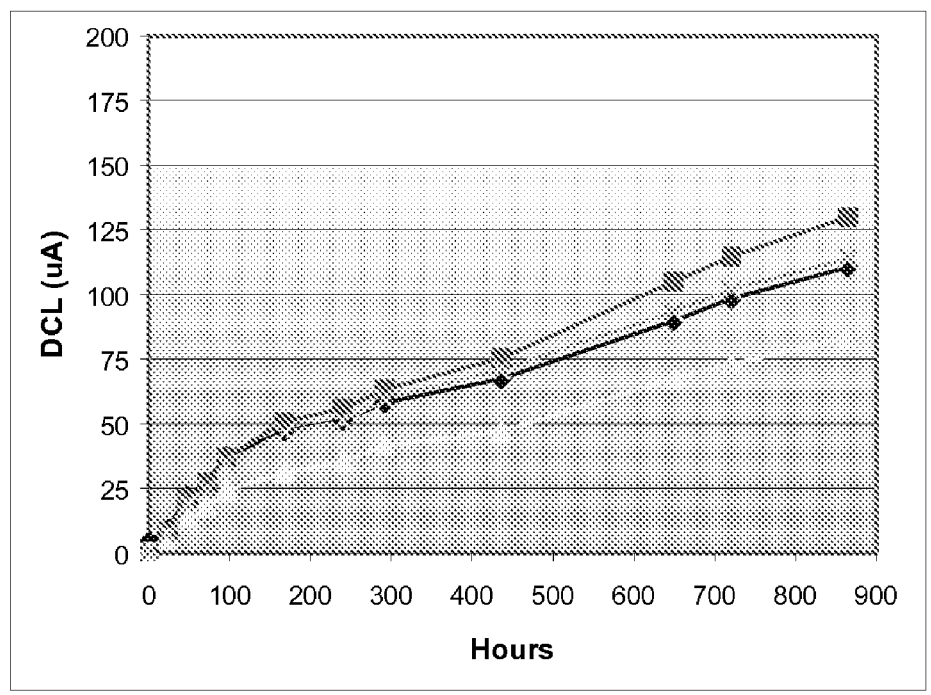
FIGS. 11-13 are graphical representations of the leakage current ("DCL"), capacitance, and ESR of the parts of Example 4 at different stages of load life testing.
Figure 12:
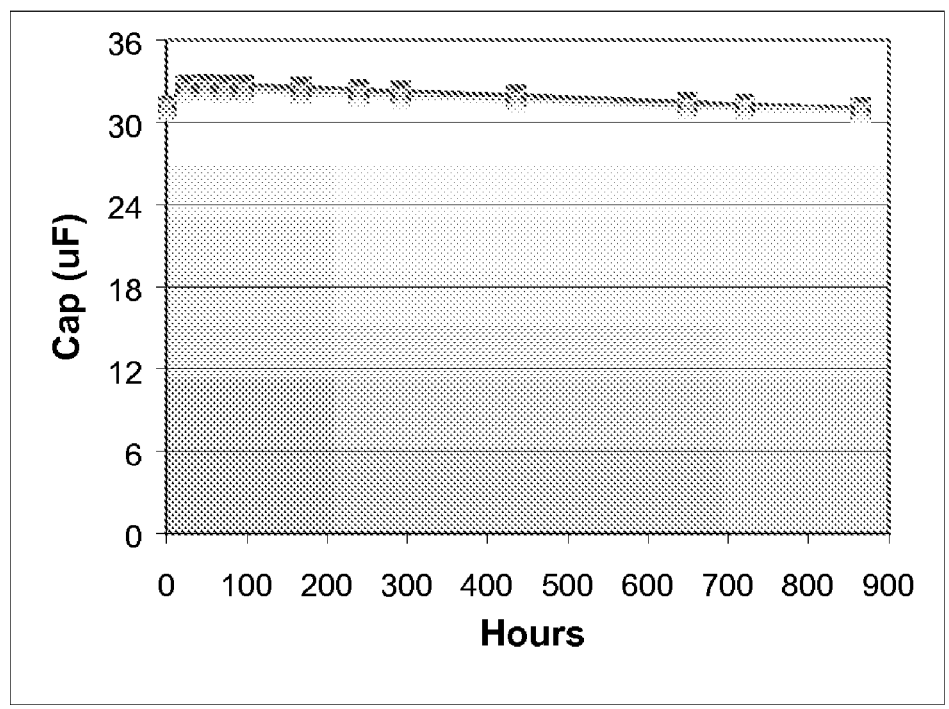
Figure 13:
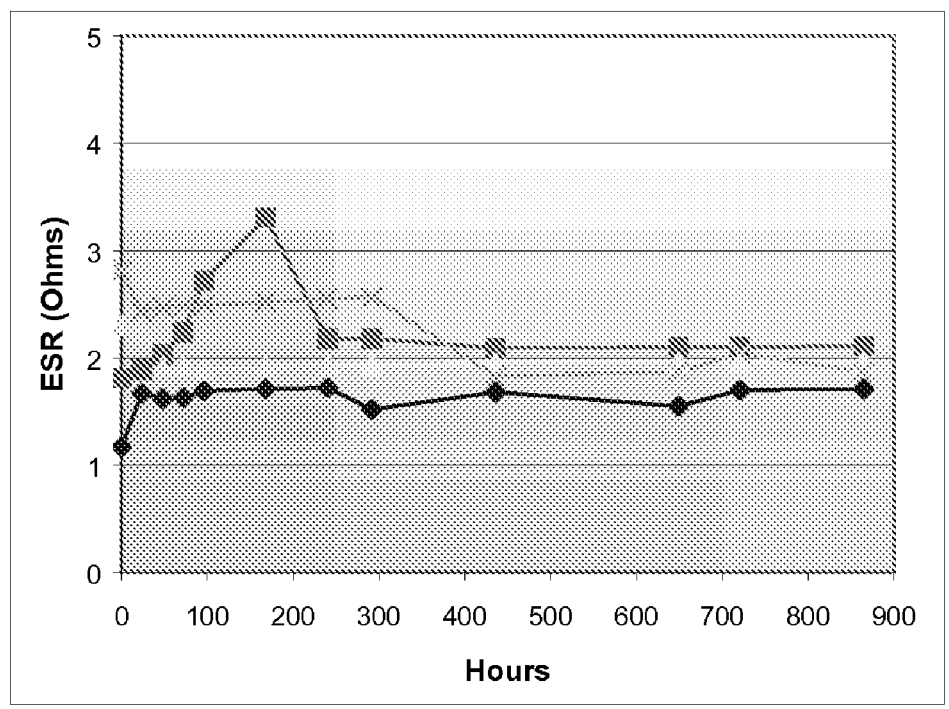

Capacitor assemblies were prepared as described in Example 1, except that the parts were placed in air at 175° C. and subjected to an applied voltage of 6.0 volts. Testing was performed on a weekly basis as described in Example 1. The results are shown in FIGS. 11-13. FIG. 11 showed an increase in DCL, which was not surprising because tantalum pentoxide has an intrinsic thermal stability problem due to migration of oxygen to tantalum substrate. As a result, the dielectric becomes thinner, making the migrations of point defects within the dielectric move relatively easier under high field. As shown in FIG. 13, no significant increase in ESR was found. ESR varied around 2.0Ω for the first 900 hundred hours. Capacitance increased a small amount in the beginning and had a tendency to decrease at a small slope. In reference to initial capacitance, the capacitance changed by −0.5% after 900 hours.

COMPARATIVE EXAMPLE 1

Figure 14:
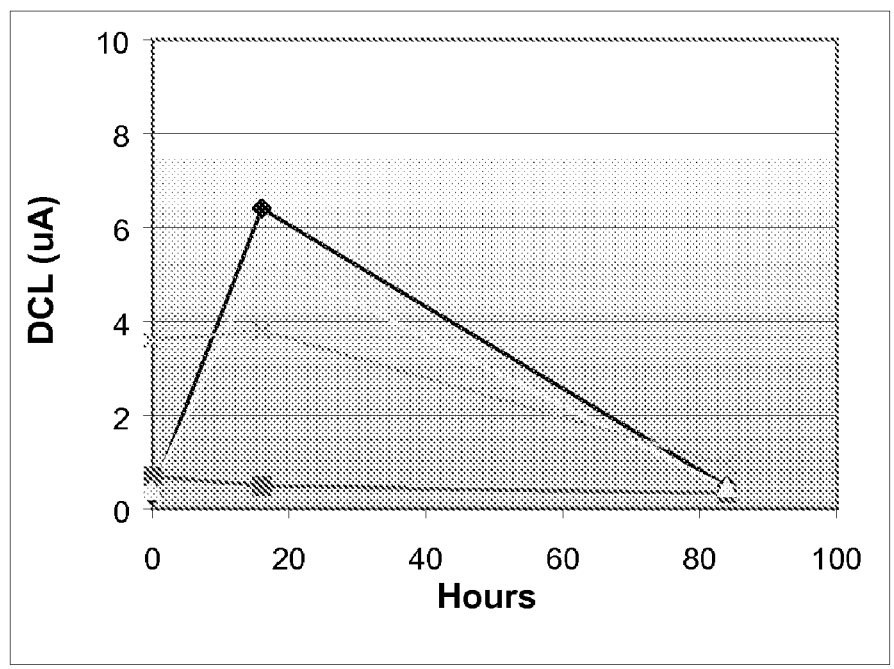
FIGS. 14-16 are graphical representations of the leakage current ("DCL"), capacitance, and ESR of the parts of the Comparative Example at different stages of load life testing.
Figure 15:
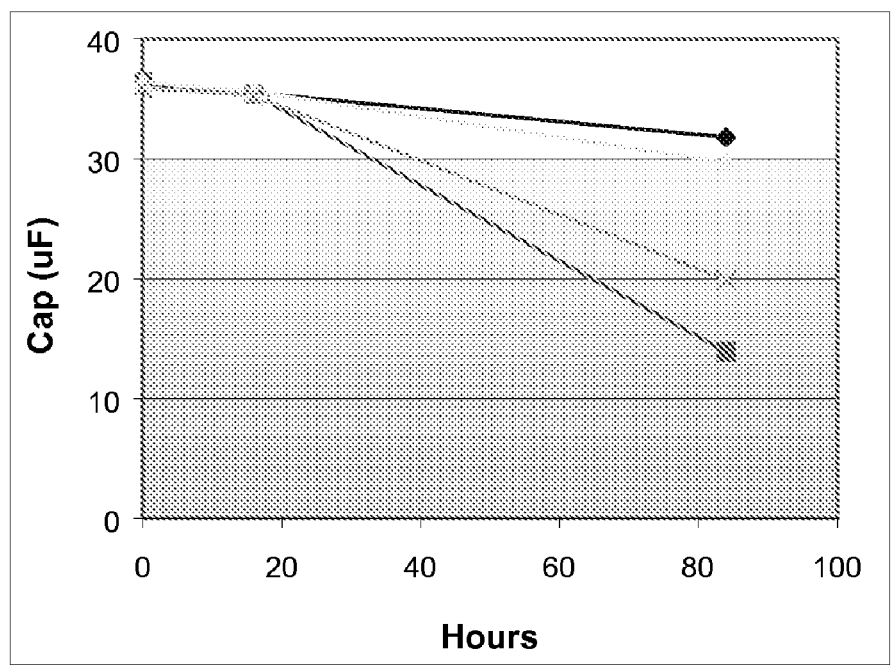
Figure 16:
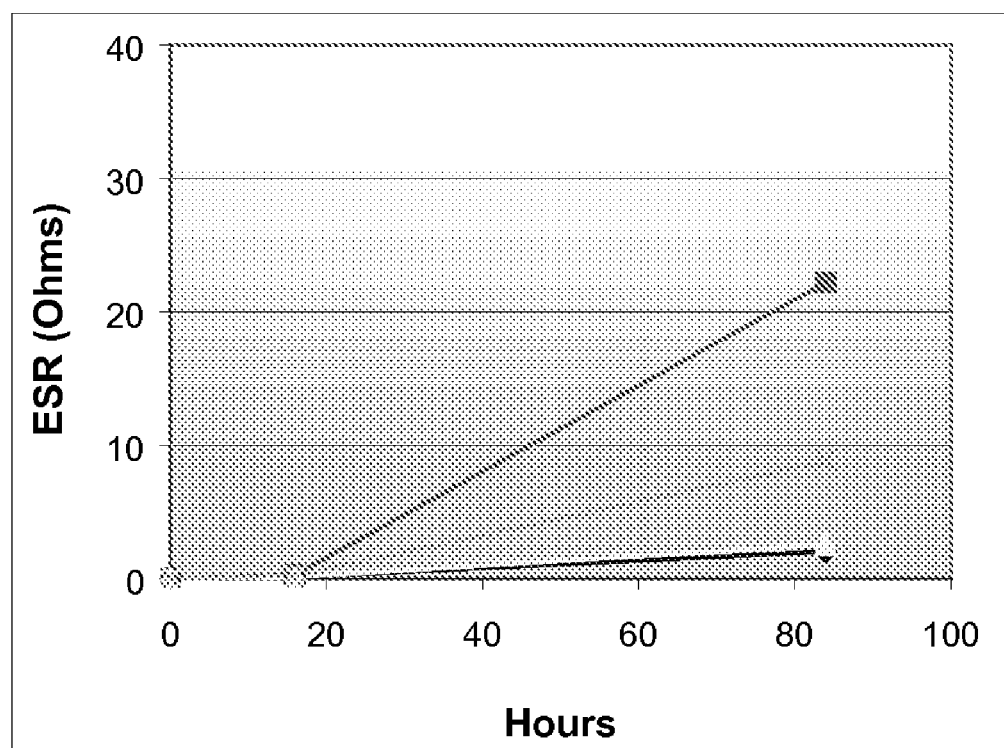

Tantalum capacitors were tested as described in Example 1 without being placed into a ceramic container. The results are shown in FIG. 14-16, which illustrate fast degradation of the conductive polymer.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A capacitor assembly comprising:
an electrolytic capacitor comprising an anode containing a porous sintered pellet that includes tantalum or niobium oxide, an anode lead wire extending from the anode, a dielectric layer formed over and within the pellet by anodic oxidation, and a cathode overlying the dielectric layer, the cathode including a conductive polymer;
a ceramic housing within which the electrolytic capacitor is enclosed, the ceramic housing being hermetically sealed to a lid, the ceramic housing defining an interior cavity having a gaseous atmosphere, the gaseous atmosphere containing an inert gas, the lid not contacting any surface of the capacitor such that the interior cavity includes a space between the lid and the capacitor, an interior surface of the ceramic housing including a first conductive trace and a second conductive trace, the first conductive trace including a surface that faces the interior cavity of the ceramic housing, wherein the anode lead wire is in direct electrical contact with the first conductive trace and the cathode is in electrical contact with the second conductive trace, a first conductive adhesive electrically connecting the first conductive trace to the anode lead wire, the only physical connection at the surface of the first conductive trace being provided by the first conductive adhesive, and a second conductive adhesive electrically connecting the second conductive trace to the cathode;
a cathode termination that is in electrical connection with the second conductive trace and located external to the ceramic housing; and
an anode termination that is in electrical connection with the first conductive trace and located external to the ceramic housing.

2. The capacitor assembly of claim 1, wherein the pellet includes tantalum.

3. The capacitor assembly of claim 1, wherein the pellet includes niobium oxide.

4. The capacitor assembly of claim 1, wherein the conductive polymer includes poly(3,4-ethylenedioxythiophene) or a derivative thereof.

5. The capacitor assembly of claim 1, wherein the inert gas includes nitrogen, helium, argon, xenon, neon, krypton, radon, or combinations thereof.

6. The capacitor assembly of claim 1, wherein inert gases constitute from about 50 wt. % to 100 wt. % of the gaseous atmosphere.

7. The capacitor assembly of claim 1, wherein inert gases constitute from about 75 wt. % to 100 wt. % of the gaseous atmosphere.

8. The capacitor assembly of claim 1, wherein oxygen constitutes less than about 1 wt. % of the gaseous atmosphere.

9. The capacitor assembly of claim 1, wherein an antireflection material is applied to one or more walls of the ceramic housing.

10. The capacitor assembly of claim 1, wherein the assembly exhibits an equivalent series resistance after aging at 150° C. for 1000 hours of about 50 ohms or less, measured at an operating frequency of 120 Hz.

11. The capacitor assembly of claim 1, wherein the assembly exhibits an equivalent series resistance after aging at 150° C. for 1000 hours of from about 0.01 to about 10 ohms, measured at an operating frequency of 120 Hz.

12. The capacitor assembly of claim 1, wherein the assembly exhibits an equivalent series resistance after aging at 175° C. for 700 hours of about 50 ohms or less, measured at an operating frequency of 120 Hz.

13. The capacitor assembly of claim 1, wherein the assembly exhibits a normalized leakage current after aging at 150° C. for 1000 hours of about 0.1 µA/µF*V or less.

14. The capacitor assembly of claim 1, wherein the assembly exhibits an normalized leakage current after aging at 175° C. for 700 hours of about 0.1 µA/µF*V or less.

15. The capacitor assembly of claim 1, wherein the electrolytic capacitor has a lower surface that defines a plane that crosses the interior cavity of the ceramic housing, the first conductive trace being located beneath this plane.

* * * * *